(12) United States Patent
Abraham et al.

(10) Patent No.: US 11,622,308 B1
(45) Date of Patent: Apr. 4, 2023

(54) TECHNIQUES FOR PREVENTING CALL DROPS DURING INTER-RAT HANDOVERS

(71) Applicant: Cisco Technology, Inc., San Jose, CA (US)

(72) Inventors: Jis Abraham, Bangalore (IN); Somaraju Kaki, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/379,471

(22) Filed: Jul. 19, 2021

(51) Int. Cl.
*H04W 36/00* (2009.01)
*H04W 36/14* (2009.01)
*H04W 84/12* (2009.01)

(52) U.S. Cl.
CPC ........ *H04W 36/14* (2013.01); *H04W 36/0011* (2013.01); *H04W 84/12* (2013.01)

(58) Field of Classification Search
CPC .. H04W 36/14; H04W 36/0011; H04W 84/12
See application file for complete search history.

(56) References Cited

U.S. PATENT DOCUMENTS

| 2015/0131615 A1 | 5/2015 | Miklós et al. | |
| 2018/0063755 A1* | 3/2018 | Chong | H04W 36/0033 |
| 2020/0053828 A1 | 2/2020 | Bharatia et al. | |
| 2020/0107213 A1 | 4/2020 | Park et al. | |
| 2020/0120570 A1 | 4/2020 | Youn et al. | |
| 2020/0154326 A1 | 5/2020 | Deenoo et al. | |
| 2020/0323008 A1* | 10/2020 | Pal | H04L 65/65 |
| 2020/0383010 A1* | 12/2020 | Zhu | H04W 76/27 |
| 2021/0037430 A1* | 2/2021 | Jin | H04W 60/00 |

OTHER PUBLICATIONS

3GPP, "3rd Generation Partnership Project; Technical Specification Group Core Network and Terminals; 5G System; Restoration Procedures (Release 17)", 3GPP TS 23.527 V17.1.0, Jun. 2021, 30 pages.
3GPP, 3rd Generation Partnership Project; Technical Specification Group Core Network and Terminals; Restoration procedures; (Release 17), 3GPP TS 23.007 V17.1.0, Jun. 2021, 115 pages.

\* cited by examiner

*Primary Examiner* — Justin Y Lee
(74) *Attorney, Agent, or Firm* — Edell, Shapiro & Finnan, LLC

(57) ABSTRACT

Presented herein are efficient techniques through which a session management function (SMF) may obtain, from a user plane function (UPF), an error indication associated with a user equipment (UE) for which a handover has been initiated from a Fourth Generation (4G) network to a Fifth Generation (5G) network. The SMF function initiates a timer in response to receiving the error indication. The SMF function stops the timer and processes a request when the request is obtained before an expiration of the timer and processes the error indication when the request is not received before the expiration of the timer.

20 Claims, 10 Drawing Sheets

US 11,622,308 B1

TECHNIQUES FOR PREVENTING CALL DROPS DURING INTER-RAT HANDOVERS

TECHNICAL FIELD

The present disclosure relates to network equipment and services.

BACKGROUND

Networking architectures have grown increasingly complex in communications environments, particularly mobile networking environments. While Fifth (5th) Generation (5G) mobile networks support Voice over New Radio (VoNR) technologies for providing voice calling services, some access networks do not fully support VoNR. As a result, a user equipment may experience an inter-access technology transition from a 5G mobile network to a Fourth (4th) Generation (4G) mobile network when initiating a network-based voice call and an inter-access technology transition from a 4G mobile network to a 5G mobile network when the voice call is completed. There are significant challenges in providing a high quality of experience to users during inter-access technology transitions for user equipment within mobile networking environments.

DESCRIPTION OF EXAMPLE EMBODIMENTS

Overview

Figure 1:
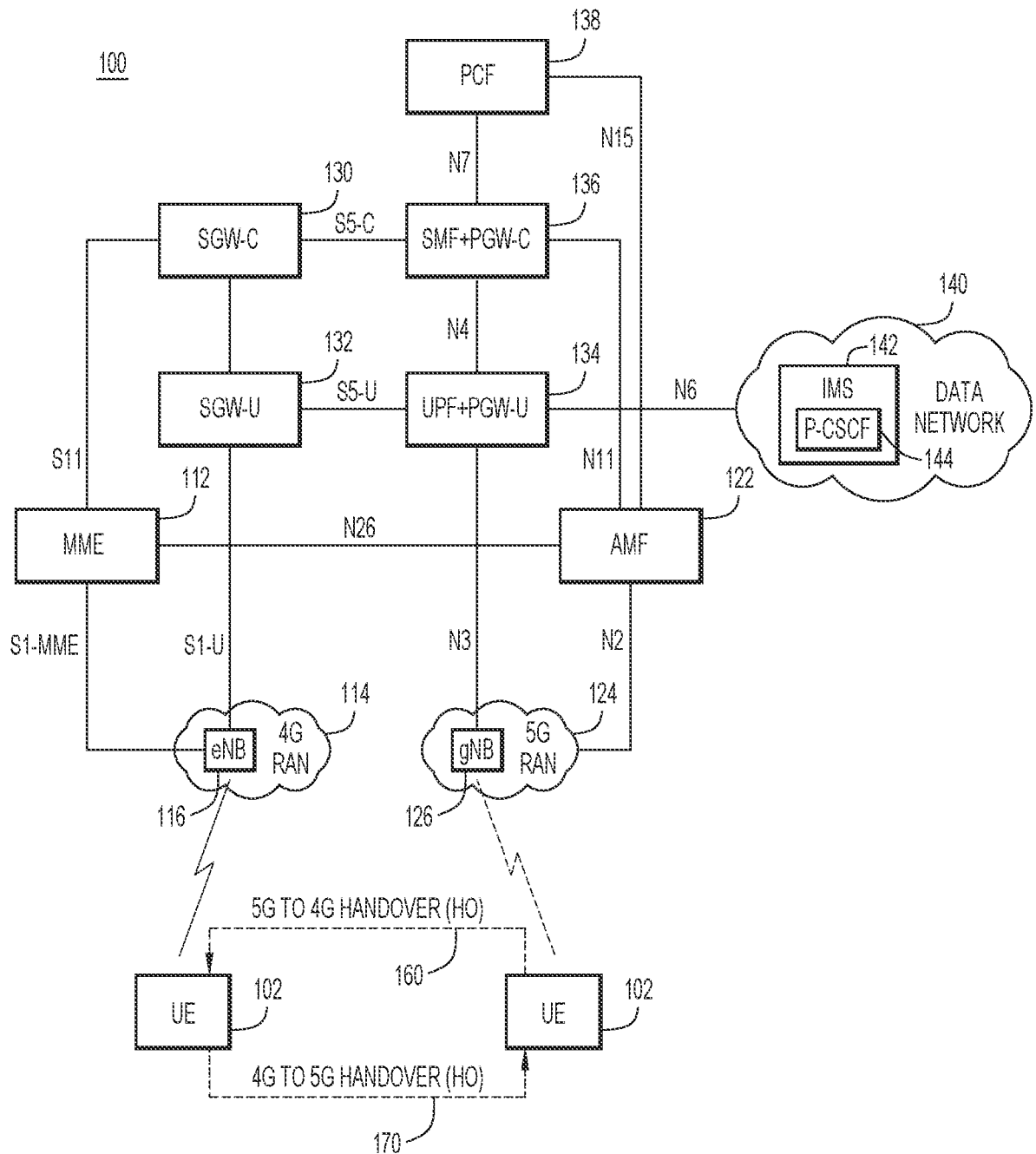
FIG. 1 is a diagram of a system in which techniques that facilitate delaying processing of an error indicator during an inter-access technology transition may be implemented, according to an example embodiment.

When a user device attempts to initiate a VoNR call via an access network that does not fully support VoNR technology, an Evolved Packet System (EPS) fallback procedure may be performed to honor the voice calls in a Third ($3^{rd}$) Generation Partnership Project (3GPP) Fifth Generation (5G) 5G network. The EPS fallback procedure involves a few sub-procedures, such as:

1. A gNB rejects the dedicated bearer procedure with the cause "Internet Protocol (IP) Multimedia Subsystem (IMS) voice EPS fallback or radio access technology (RAT) fallback triggered;"
2. The access network is released;
3. A 5G to 3GPP Fourth Generation (4G) handover procedure is performed;
4. A dedicated bearer establishment procedure is performed in the 4G network to honor the voice calls; and
5. Post-completion of the voice call in the 4G network, the user device is moved back to the 5G network.

Thus, the EPS fallback procedure involves back-to-back inter-access technology transitions or handovers. In some instances, call drops are observed during the 4G to 5G handover for instances in which the eNodeB attempts to handle packets destined for the user device during inter-RAT handovers. This has significant impact on the end user experience, especially when the user device completes a voice call and a handover from the 4G access back to the 5G access is triggered.

More specifically, when the voice call is completed, the 4G RAT connection may be released and a 4G network to 5G network handover may be initiated with respect to the user device. Any data destined for the user device that is received after the 4G RAT connection is released and before the handover to 5G has been completed causes an error indication to be received at a session management function (SMF)+control plane packet data network (PDN) gateway (PGW-C) function. If the SMF+PGW-C receives the error indication before receiving a Create Session Management (SM) Session Context Request for a protocol data unit (PDU) session to complete the handover, the SMF+PGW-C releases the PDU connection, which results in dropped calls and a poor quality of experience for users.

Presented herein are efficient techniques through which a SMF+PGW-C initiates a timer in response to receiving an error indication during a 4G network to 5G network handover of a user device and delays processing of the error indication until the timer has expired. According to implementations presented herein, the timer is stopped and the error indication is not processed if a request is received before the expiration of the timer. In one implementation, the request may include a Create Session Management (SM) Session Context request from an access and mobility management function (AMF) associated with a handover of a user equipment from a 4G mobile network to a 5G mobile network. In another implementation, the request may include an update and/or delete bearer command from a control plane serving gateway (SGW-C). In another implementation, the request may include a create, update, and/or delete bearer response from a SGW-C. In another implementation, the request may include a create session request including a handover indicator for a wireless local area network handover. A length of the timer may be variable and may be based on an observed delay time in receiving the request after receiving the error indication.

EXAMPLE EMBODIMENTS

3GPP specifications define operations for handling error indications. 3GPP Technical Specification (TS) 23.007, Section 21.8 describes that if a PGW receives a general packet radio service (GPRS) tunneling protocol (GTP) Error Indication for the default bearer, the PGW deletes all bearer context associated with a packet data network (PDN) connection. However, 3GPP TS 23.007 outlines a generic/common behavior for handling an error indication report (ERIR) irrespective of the stage of the call flow or the state of a user equipment (UE). Therefore, if an ERIR is received while a handover of a UE from a 4G network to a 5G network has been initiated, but has not been completed, all bearer contexts associated with the PDN connection will be deleted, which may result in a loss of data or a dropped call.

Presented herein are various techniques that may prevent a PDU connection from being released before a 4G to 5G handover of a UE is completed by delaying processing of an ERIR. According to implementations presented herein, delaying processing of the ERIR may be performed by initiating a timer when the ERIR is received and processing the ERIR when the timer expires and if no additional messages are received before the timer expires. Delaying processing of the ERIR may allow messages associated with the handover to be processed and may prevent the PDU connection from being released when the messages are received after the ERIR.

Referring to FIG. 1, FIG. 1 is a block diagram of a system 100 in which techniques that delay processing of an error indication during a 4G network to 5G network handover of a user equipment (UE) may be implemented, according to an example embodiment. System 100 may include a UE 102, a 4G Radio Access Network (RAN) 114, a 5G RAN 124, a mobility management entity (MME) 112, an access and mobility management function (AMF) 122, an SGW-C 130, a user plane SGW (SGW-U) 132, a combined user plane function (UPF)+user plane PGW (PGW-U) 134, a combined SMF+PGW-C 136, a policy control function (PCF) 138, and a data network (DN) 140.

A 4G mobile network associated with 4G RAN 114 may be referred to herein interchangeably using the terms '4G EPS', 'EPS', 'LTE', and variations thereof, such that the 4G mobile network includes the MME 112, the SGW-C 130, the SGW-U 132, the PGW-U portion of the combined UPF+PGW-U, and the PGW-C portion of the combined SMF+PGW-C. A 5G mobile network associated with 5G RAN 126 may be referred to herein interchangeably using the terms '5GS', '5GC', and variations thereof, such that the 5G mobile network includes the AMF 122, the UPF portion of the combined UPF+PGW-U 134, the SMF portion of the combined SMF+PGW-C 136, and the PCF 138.

4G RAN 114 may include an evolved NodeB (eNodeB or eNB) 116 that interfaces with MME 112 via an S1-MME interface and with SGW-U 132 via an S1-U interface. MME 112 further interfaces with SGW-C 130 via an S11 interface and with AMF 122 via an N26 interface. SGW-U 132 additionally interfaces with SGW-C 130. SGW-C 130 further interfaces with the PGW-C portion of the combined SMF+PGW-C 136 via an S5-C interface and the SGW-U 132 further interfaces with the PGW-U portion of the combined UPF+PGW-U 134 via an S5-U interface.

Among other operations as discussed for various embodiments described herein, an MME, such as MME 112, generally performs operations for a 4G mobile network such as tracking area list management, idle mode UE tracking, bearer activation and deactivation, authentication services, etc. SGW-U 132 may process and perform operations on subscriber (e.g., UE) traffic as the traffic passes through the mobile network. SGW-C 130 facilitates end-to-end mobile network connectivity.

5G RAN 124 (also referred to as 5G New Radio (NR) access) includes a next generation NodeB (gNodeB or gNB) 126 that interfaces with AMF 122 via an N2 interface and with UPF+PGW-U 134 via an N3 interface. Although a 5G RAN, such as 5G RAN 124, is illustrated for systems described herein, it is to be understood that any next Generation (nG) RAN may be utilized in accordance with techniques discussed for various embodiments described herein.

Typically, an AMF, such as AMF 122, provides access authentication services, authorization services, and mobility management control functions. UPF+PGW-U 134 may support features and capabilities to facilitate user plane operation, such as packet routing and forwarding, interconnection to a data network, policy enforcement, and data buffering for 5G network connectivity (via the UPF portion) and 4G/LTE network connectivity (via the PGW-U) portion.

AMF 122 interfaces with SMF+PGW-C 136 via an N11 interface and with PCF 138 via an N15 interface. SMF+PGW-C 136 is responsible for session management with individual functions being supported on a per session basis for 5G sessions (via the SMF portion) and 4G/LTE sessions (via the PGW-C portion). SMF+PGW-C 136 interfaces with UPF+PGW-U 134 via an N4 interface and with PCF 138 via an N7 interface. Typically, a PCF, such as PCF 138, provides policy rules (e.g., network slicing, roaming, mobility management, etc.) for control plane functions and supports quality of service policy and charging control functions. UPF+PGW-U 134 and SMF+PGW-C 136 may facilitate interworking between 5GS and EPC and may serve a UE based on the UE mobility management (MM) Core Network Capability and a UE subscription.

UPF+PGW-U 134 is connected to data network 140 via an N6 interface. Data network 140 includes an IMS 142. An IMS, such as IMS 142, provides IP multimedia services to a UE, such as UE 102. IMS 142 includes proxy call session control function (P-CSCF) 144. P-CSCF 144 is responsible for processing session initiation protocol (SIP) signaling packets in IMS 142 for establishing an IMS voice/video call for a UE, such as UE 102.

For the 4G RAN 114, eNB 116 may include any combination of hardware (e.g., communications units, receiver(s), transmitter(s), antenna(s) and/or antenna array(s), processor(s), memory element(s), baseband processor(s) (modems), etc.)], software, logic, and/or the like that may facilitate access network connections for one or more elements of systems discussed herein, including, but not limited to, over-the-air Radio Frequency (RF) communications with UE 102. For 5G RAN 124, gNB 126 may also include any combination of hardware (e.g., communications units, receiver(s), transmitter(s), antenna(s) and/or antenna array(s), processor(s), memory element(s), baseband processor(s) (modems), etc.)], software, logic, and/or the like that may facilitate access network connections for one or more elements of systems discussed herein, including, but not limited to, over-the-air RF communications with UE 102.

In various embodiments, UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a 4G cellular communications unit, a 5G cellular communications unit, a Wi-Fi® communications unit, etc.) to facilitate over-the-air interfaces with any combination of RANs (e.g., 4G RAN 114 and 5G RAN 124).

As further described below with respect to FIGS. 2A and 2B, in one scenario, UE 102 may attempt to access IMS 142 via 5G RAN 124 to initiate a voice call using VoNR and, if 5G RAN 124 does not support VoNR, gNB 126 may reject the dedicated bearer procedure. In this scenario, a 5G to 4G handover 160 may be performed with respect to UE 102 and UE 102 may access IMS 142 to initiate the voice call via 4G RAN 114. As shown in FIG. 1, when the voice call is complete, a 4G to 5G network handover 170 may be initiated with respect to UE 102. For example, upon completion of the voice call, PCF 138 may trigger a voice bearer termination and eNB 116 may trigger the handover to 5G and release the data path/S1-U tunnel.

As further described below with respect to FIGS. 2A and 2B, if additional downlink packets are received by eNB 116 from data network 140 after release of the S1-U tunnel, but prior to the completion of the 4G to 5G handover, the downlink packets are dropped and eNB 116 sends an error indication to SGW-U 132, which forwards the error indication to SGW-C 130. SGW-C 130 releases the PDU connection and sends a release to SGW-U 132. If additional downlink packets are transmitted from UPF+PGW-U 134, an error indication is transmitted from SGW-U 132 to UPF+PGW-U 134. When UPF+PGW-U 134 receives the error indication, UPF+PGW-U 134 transmits an N4_Session_Report_Request with an ERIR to SMF+PGW-C 136.

Additionally, after releasing the S1-U tunnel, eNB 116 transmits a Handover Required message to MME 112 to trigger the handover to 5G. After receiving the Handover Required message, MME 112 forwards a Relocation Request to AMF 122. AMF 122 transmits a Create Session Management (SM) Session Context request message (such as a 3GPP Nsmf_PDUSession_CreateSMContext request message per 3GPP standards) to SMF+PGW-U 134 to create a session management context within the 5G network for information in the 4G network to complete the 4G network to 5G network handover.

In some scenarios, the ERIR from UPF+PGW-U 134 may reach SMF+PGW-C 136 before the Nsmf_PDUSession_CreateSMContext request reaches SMF+PGW-C 136. Per 3GPP TS 23.007, upon receiving the ERIR from UPF+PGW-U 134, SMF+PGW-C 136 releases the PDU session. Because the ERIR is received before the Nsmf_PDUSession_CreateSMContext request is received, the PDN connection is released prior to completion of the 4G network to 5G network handover. As a result, UE 102 experiences a dropped call, which leads to poor end-user experience.

To address the poor quality of experience for end users, techniques herein provide for initiating a delay timer at SMF+PGW-C 136 when SMF+PGW-C 136 receives the ERIR from UPF+PGW-U 134. In one implementation, if a message or request (such as the Nsmf_PDUSession_CreateSMContext request, an update and/or delete bearer command from a SGW-C, a create, update, and/or delete bearer response from a SGW-C, and/or a handover indicator for a wireless local area network handover) is received prior to expiration of the timer, the timer is stopped, the message or request is processed, and the ERIR is not processed. In another implementation, if no message or request is received prior to the expiration of the ERIR, the ERIR is processed.

Figure 2A:
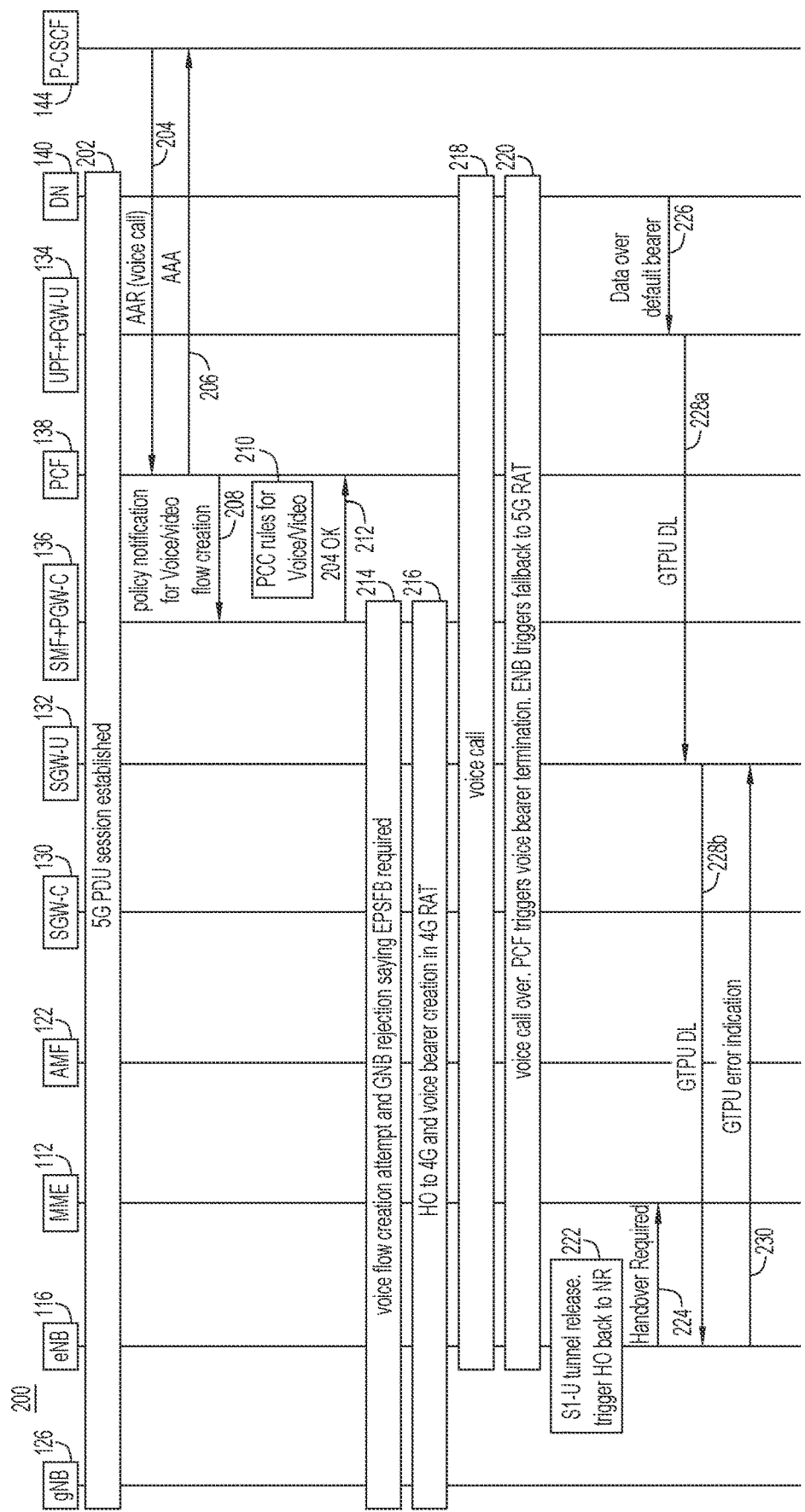
FIGS. 2A and 2B are a message sequence diagram illustrating a call flow illustrating an example handover failure that may occur during an inter-access technology transitions in some instances.
Figure 2B:
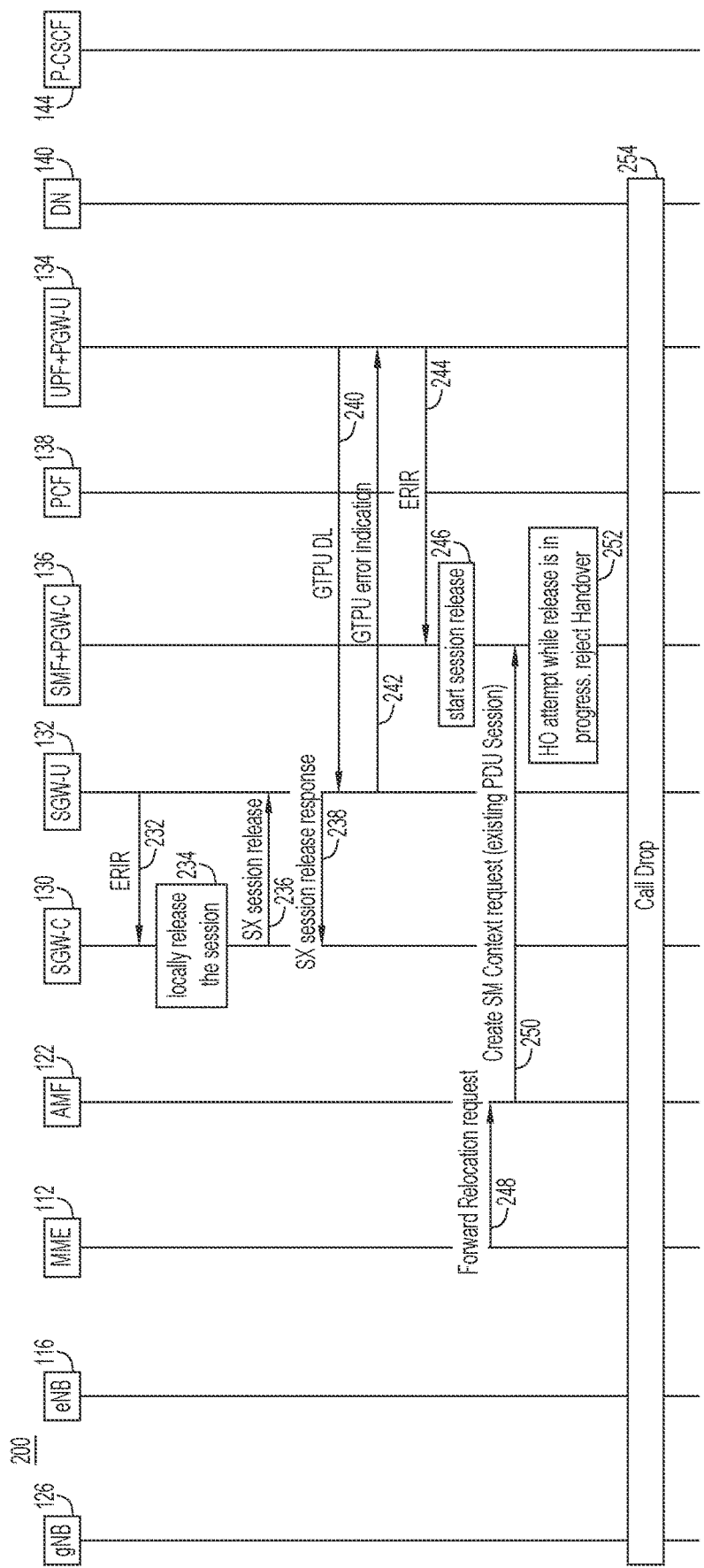

Referring to FIGS. 2A and 2B, FIGS. 2A and 2B are message sequence diagrams illustrating a call flow 200 that illustrates an example handover failure that may occur during an inter-access technology transition in some instances. In at least one embodiment, call flow 200 illustrates example operations that may be performed within system 100 for instances in which the elements of system 100 are not enhanced to perform operations in accordance with embodiments herein, and which may result in dropped calls. In particular, the operations described with reference to call flow 200 are described under the assumption that SMF+PGW-C 136 is not enhanced to perform operations as discussed in further detail herein at least with reference to FIGS. 3, 4 5, 6, and 7 discussed below. FIGS. 2A and 2B include gNB 126, eNB 116, MME 112, AMF 122, SGW-C 130, SGW-U 132, SMF+PGW-C 136, PCF 138, UPF+PGW-U 134, DN 140, and P-CSCF 144. Although not shown in FIGS. 2A and 2B, UE 102 is discussed with reference to various operations illustrated for FIGS. 2A and 2B.

As shown in FIG. 2A, at 202, a 5G PDU session may be established. For example, UE 102 may establish a 5G PDU session for sending and receiving data with DN 140 via 5G RAN 124 and gNB 126. At 204, when a new voice or video call is initiated by UE 102, PCF 138 obtains a trigger from P-CSCF 144 and, at 208, PCF 138 initiates the dedicated flow creation toward SMF+PGW-C 136. At 210, policy and charging control (PCC) rules for the voice/video call are determined by PCF 138 and at 212, SMF+PGW-C 136 transmits a "204 OK" message to PCF 138.

At 214, SMF+PGW-C 136 transmits a voice flow creation request to gNB 126 and gNB 126 transmits a rejection message to SMF+PGW-C 136 indicating that an evolved packet system fallback (EPS-FB) is required. For example, gNB 126 may determine that gNB 126 is not currently supporting the type of voice/video call (e.g., VoNR) requested by UE 102 and gNB 126 may reject the voice flow creation request with a cause "IMS voice EPS fallback or RAT fallback triggered." SMF+PGW-C 136 receives the rejection message and waits for a handover of UE 102 from 5G to 4G. At 216, gNB 126 initiates the handover of UE 102 to 4G and SMF+PGW-C 136 retries the dedicated voice bearer creation in 4G RAT for the voice/video call. When the handover is complete, at 218, the voice/video call is performed between UE 102 and DN 140 via eNB 116.

When the voice call is complete, steps are taken to move UE 102 back to the 5G network. At 220, PCF 138 triggers a voice bearer termination and eNB 116 triggers a fallback to 5G RAT. At 222, eNB 116 releases the S1-U tunnel and triggers a handover of UE 102 to the 5G network and, at 224, eNB 116 transmits a message to MME 112 indicating that a handover is required. At 226, consider a case in which UPF+PGW-U 134 subsequently receives downlink (DL) data for the UE 102 from DN 140. For example, data that is destined for UE 102 is received over a default bearer after the S1-U tunnel has been released. At 228a and 228b, the DL data is transmitted toward eNB 116 via SGW-U 132 using a user plane GPRS tunneling protocol (GTPU) message.

Referring to FIG. 2B, when eNB 116 receives the data, because the S1-U tunnel has been released, at 230, eNB 116 transmits a GTPU error indication to SGW-U 132. When SGW-U 132 receives the GTPU error indication, at 232, SGW-U 132 transmits an ERIR to SGW-C 130. At 234, in response to receiving the ERIR, SGW-C 130 locally releases the session/PDU connection and, at 236-238, SGW-C 130 sends an Sx session release message to SGW-U 132 and receives a Sx session release response from SGW-U 132. At 240, UPF+PGW-U 134 transmits a downlink data packet to SGW-U 132. For example, UPF+PGW-U 134 may re-attempt to transmit data packets from DN 140 toward UE 102. Because the session has been released, at 242, SGW-U 132, transmits a GTPU error indication to UPF+PGW-U 134. When UPF+PGW-U 134 receives the GTPU error indication from SGW-U 132, at 244, UPF+PGW-U 134 transmits ERIR to SMF+PGW-C 136 with an N4_Session_Report_Request to report information related to the session. Because the handover to 5G has not been completed and the session is still in the 4G network, when SMF+PGW-C 136 receives the ERIR, at 246, SMF+PGW-C 136 releases the session in this example.

Additionally, after eNB 116 transmits the message to MME 112 indicating that a handover is required to trigger the handover to 5G (i.e., at 224), at 248, MME 112 transmits a forward relocation request to AMF 122. At 250, AMF 122 transmits a Create SM Session Context Request message (e.g., formatted as an Nsmf_PDUSession_CreateSMContext request message per 3GPP standards) to SMF+PGW-C 136 to complete the 5G handover. However, since SMF+PGW-C 136 received the ERIR (i.e., at 244) prior to receiving the create SM context request, at 252, SMF+PGW-C 136 rejects the handover because the session release is in progress. At 254, the call is dropped because the session has been released before the handover to 5G has been completed. Thus, as illustrated in FIGS. 2A and 2B, without enhancements as discussed for various embodiments herein, users may experience session/call drops after completing voice calls and customers may experience a significant reduction in user experience after completing voice calls. By enhancing SMF+PGW-C 136 to provide ERIR delay timer operations, as described below with respect to FIG. 3, a rate of dropped calls can be reduced and an improvement in the user experience can be observed.

As further described below with respect to FIG. 3, embodiments herein provide solutions to the issue of post-voice call session drops by providing efficient techniques through which SMF+PGW-C 136 initiates an ERIR delay timer in response to receiving the ERIR and does not process the ERIR unless the timer expires without receiving a subsequent request or message to perform some other function, which causes the timer and the subsequent ERIR processing to be stopped. For example, according to one implementation, if a message or request, such as a Create SM Session Context Request message (e.g., formatted as an Nsmf_PDUSession_CreateSMContext request per 3GPP standards), is received prior to the expiration of the timer, the received message or request will be processed, the ERIR delay timer will be stopped, and the ERIR will not be processed. A length of time for the ERIR delay timer may be configurable. For example, the maximum delay between receiving the ERIR and the Nsmf_PDUSession_CreateSM-Context request at SMF+PGW-C 136 is two seconds, so the length of the timer may be set to two seconds. By delaying the processing of the ERIR, 4G network to 5G network handover failures can be decreased and users can experience a greater quality of service.

Figure 3:
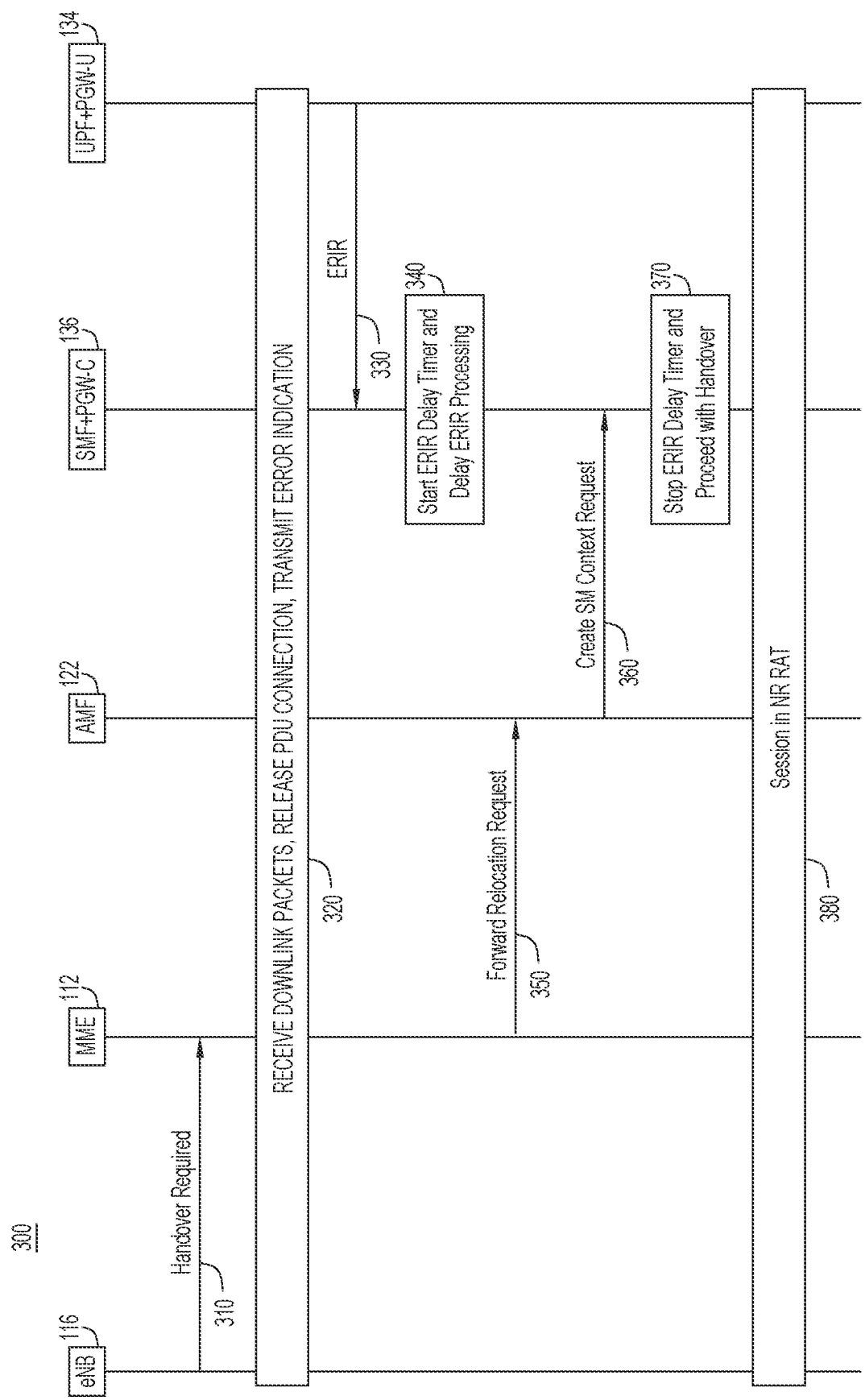
FIG. 3 is a message sequence diagram illustrating a call flow associated with delaying processing of an error indicator when performing an inter-access technology transition, according to an example embodiment.

Referring to FIG. 3, FIG. 3 is a message sequence diagram illustrating a call flow 300 associated with delaying processing of an ERIR when performing a handover from a 4G network to a 5G network after completion of a voice/video call, according to an example embodiment. In at least one embodiment, call flow 300 illustrates example operations that may be performed, at least in part, by eNB 116, MME 112, AMF 122, SMF+PGW-C 136, and UPF+PGW-U 134 in which, in particular, the SMF+PGW-C 136 is enhanced to provide various ERIR delay timer operations, according to an example embodiment. Various operations for FIG. 3 may be discussed with reference to UE 102, gNB 126, SGW-C 130, SGW-U 132, PCF 138, DN 140, and P-CSCF 144, however, these elements are not shown in FIG. 3 for purposes of brevity only in order to illustrate other features that may be provided by SMF+PGW-C 136.

At 310, consider that eNB 116 transmits a message to MME 112 indicating that a handover to a 5G network is required. For example, in the example discussed in FIG. 3, consider similar to operations as discussed above at 202, 204, 206, 208, 210, 212, 214, 216, 218, 220, and 222 discussed with respect to FIGS. 2A and 2B, that UE 102 has completed a voice or video call over a 4G network, the S1-U tunnel has been released, and a handover of UE 102 to a 5G network has been triggered by eNB 116 at 310. After the handover to 5G has been initiated, at 320, consider that downlink packets to be delivered to UE 102 are received from DN 140, the PDU connection is released, and an error indication is transmitted to UPF+PGW-U 134, similar to operations as discussed above at 226, 228, 230, 232, 234, 236, 238, 240, and 242 of FIGS. 2A and 2B. Similar to operations as discussed above at 244 of FIGS. 2A and 2B, after the error indication is transmitted to UPF+PGW-U 134, at 330, UPF+PGW-U 134 transmits an ERIR to SMF+PGW-C 136. After receiving the ERIR, at 340, SMF+PGW-C 136 is enhanced to initiate an ERIR delay timer and delay processing the ERIR until the ERIR delay timer expires or a subsequent request/message that stops the ERIR delay timer is received. A length of the ERIR delay timer is configurable and can range from a few milliseconds to a few seconds in various embodiments. For example, if the maximum delay time between receiving the ERIR and receiving the request/message is two seconds, the timer may be set to expire after two seconds. Different than FIGS. 2A and 2B discussed above, enhancing SMF+PGW-C 136 to initiate the ERIR delay timer allows additional time for the 4G to 5G handover to be completed before the ERIR is processed.

After receiving the message that a handover to 5G is required (i.e., at 310), at 350, MME 112 forwards a relocation request to AMF 122. At 360, AMF 122 transmits a create SM context request to SMF+PGW-C 136 to complete the handover to 5G, similar to at 250 in FIG. 2B. However, different than FIGS. 2A and 2B above, for the embodiment illustrated in FIG. 3, the create SM context request is received at SMF+PGW-C 136 prior to the expiration of the ERIR delay timer provided by SMF+PGW-C 136. Because the create SM context request is received at SMF+PGW-C 136 prior to the expiration of the ERIR delay timer, at 370, the ERIR delay timer is stopped, the ERIR is not processed, and the create SM context request is processed (i.e., the handover procedure proceeds). If no request/message (e.g., the create SM context request) is received before the timer expires, the ERIR is processed. For example, SMF+PGW-C 136 may process the ERIR and release the PDU connection. At 380, after the handover to 5G has been completed, the session is continued in NR RAT.

Accordingly, by delaying the processing of the ERIR to allow the create SM context request (or another request/ message, as discussed in further detail below) to be received at SMF+PGW-C 136 before processing the ERIR, dropped calls or sessions may be minimized when performing a handover from a 4G network to a 5G network in accordance with embodiments herein. Thus, users may experience fewer dropped calls during 4G to 5G handovers after 4G voice calls and a quality of experience for users can be increased.

Figure 4:
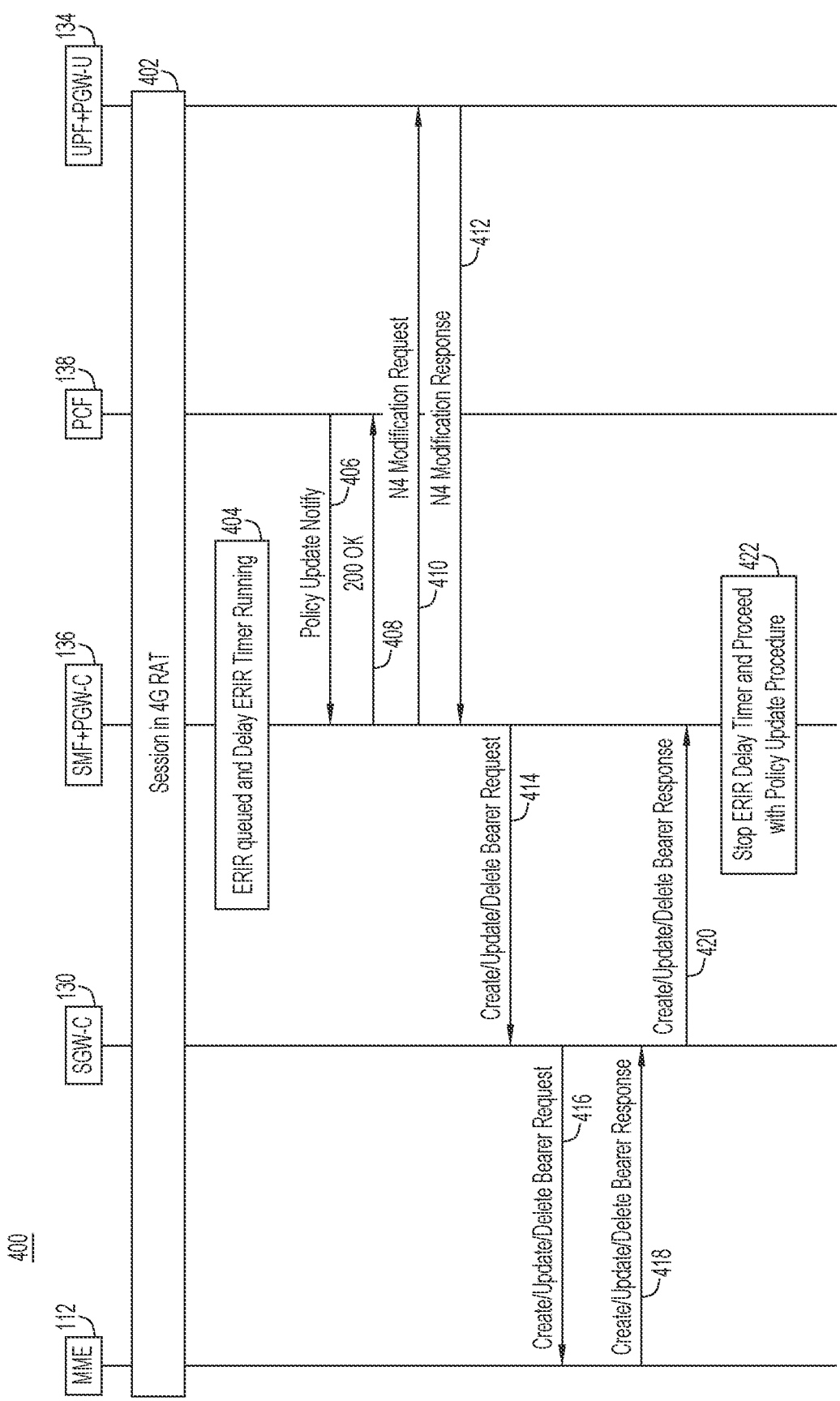
FIGS. 4, 5, and 6 are message sequence diagrams illustrating call flows associated with stopping processing of an error indicator in response to receiving a message, according to an example embodiment.

Referring to FIG. 4, FIG. 4 is a message sequence diagram illustrating a call flow 400 associated with stopping an ERIR delay timer based on receiving a create/update/ delete bearer response, according to an example embodiment. FIG. 4 includes MME 112, SGW-C 130, SMF+ PGW-C 136, PCF 138, and UPF+PGW-U 134, according to an example embodiment. Various operations for FIG. 4 may be discussed with reference to UE 102, gNB 126, SGW-C 130, SGW-U 132, PCF 138, DN 140, and P-CSCF 144, however, these elements are not shown in FIG. 4 for purposes of brevity only in order to illustrate other features that may be provided by SMF+PGW-C 136.

In the example illustrated in FIG. 4, consider that UE 102 has a session in the 4G RAT, as shown at 402, and that SMF+PGW-C 136 has received an ERIR and has initiated the ERIR delay timer at 404, similar to that as discussed above at 350 in FIG. 3. At 406, PCF 138 may transmit a policy update notification to SMF+PGW-C 136 indicating an update to a policy and, at 408, SMF+PGW-C 136 may respond with a "200 OK" message. At 410, SMF+PGW-C 136 transmits an N4 modification request to UPF+PGW-U 134 to request a session modification and, at 412, UPF+ PGW-U 134 responds with an N4 modification response. At 414, SMF+PGW-C 136 transmits a request to SGW-C 130 to create, update, or delete a bearer, and at 416, SGW-C 130 forwards the request to MME 112. At 418, MME 112 sends a response to the create/update/delete bearer request and, at 420, SGW-C 130 forwards the response to SMF+PGW-C 136. When SMF+PGW-C 136 receives the create/update/ delete bearer response from SGW-C, at 422, SMF+PGW-C 136 stops the ERIR delay timer, does not process the ERIR, and proceeds with the policy update procedure. If no request/message (e.g., the create/update/delete bearer response) is received before the timer expires, the ERIR is processed. For example, SMF+PGW-C 136 may process the ERIR and release the PDU connection.

In this way, the PDU session may not automatically be released when the ERIR is received at SMF+PGW-C 136 and the policy update procedure may be performed after the SMF+PGW-C 136 receives the ERIR.

Figure 5:
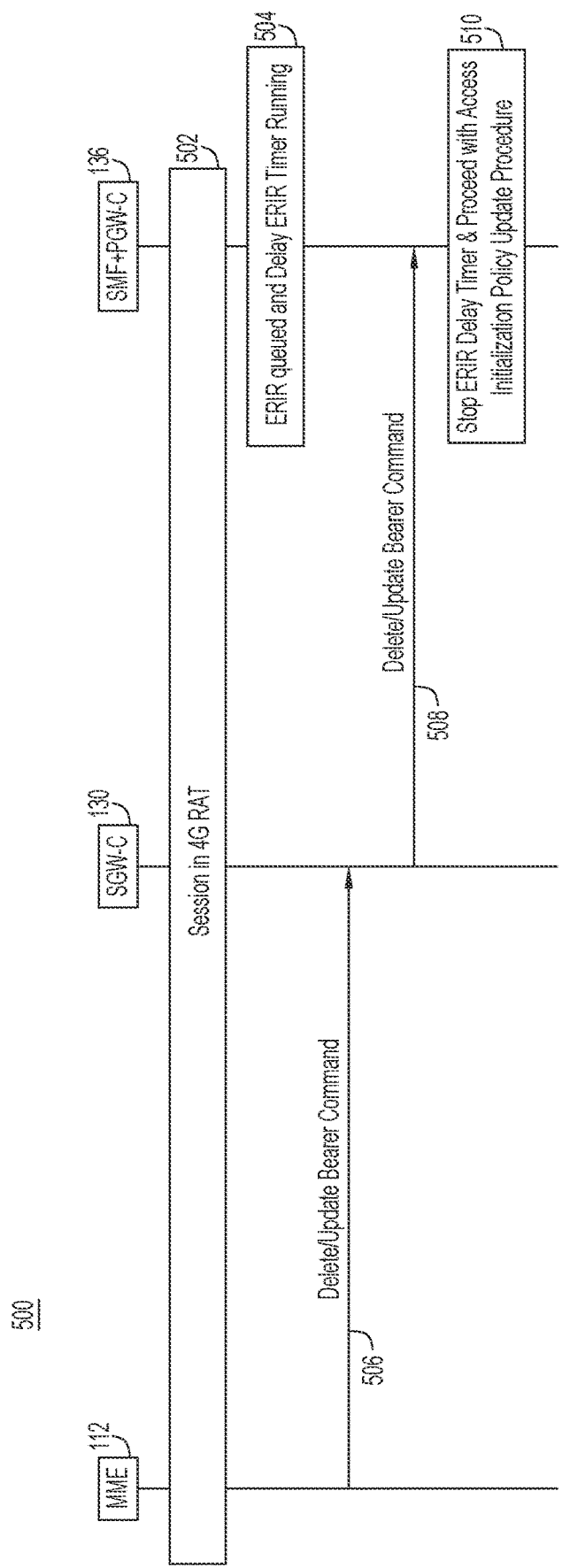

Referring to FIG. 5, FIG. 5 is a diagram depicting a method 500 of stopping the ERIR delay timer based on receiving a 4G core initiated delay/update bearer command, according to implementations herein. In at least one embodiment, method 500 illustrates example operations that may be performed, at least in part, by MME 112, SGW-C 130, and SMF+PGW-C 136, according to an example embodiment. Various operations for FIG. 5 may be discussed with reference to UE 102, gNB 126, SGW-C 130, SGW-U 132, PCF 138, DN 140, and P-CSCF 144, however, these elements are not shown in FIG. 5 for purposes of brevity only in order to illustrate other features that may be provided by SMF+ PGW-C 136.

In the example illustrated in FIG. 5, consider that UE 102 has a session in the 4G RAT, as shown at 502, and that SMF+PGW-C 136 has received an ERIR and has initiated the ERIR delay timer at 504, similar to that as discussed above at 350 in FIG. 3. At 506, MME 112 may transmit a command to SGW-C 130 to delete or update a bearer. At 508, SGW-C may forward the delete/update bearer command to SMF+PGW-C 136. At 510, SMF+PGW-C 136 stops the ERIR delay timer and proceeds with an access initialization policy update procedure based on receiving the delete/update bearer command. If no request/message (e.g., the delete/update bearer command) is received before the timer expires, the ERIR is processed. For example, SMF+ PGW-C 136 may process the ERIR and release the PDU connection.

In this way, the PDU session may not automatically be released when the ERIR is received at SMF+PGW-C 136 and the access initialization policy update procedure may be performed after the SMF+PGW-C 136 receives the ERIR.

Figure 6:
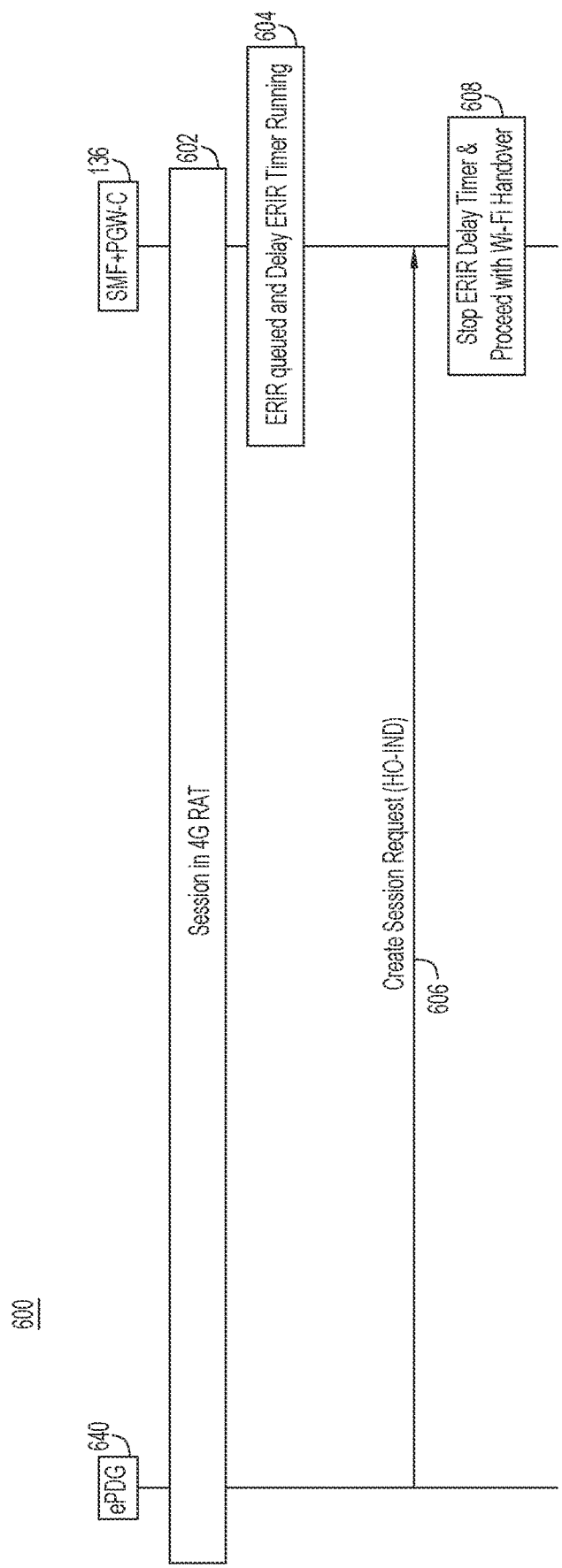

Referring to FIG. 6, FIG. 6 is a diagram depicting a method 600 of stopping the ERIR delay timer based on receiving a request to perform a handover to Wi-Fi, according to implementations herein. In at least one embodiment, method 600 illustrates example operations that may be performed, at least in part, by an evolved packet data gateway (ePDG) 440 and SMF+PGW-C 136, according to an example embodiment. Various operations for FIG. 6 may be discussed with reference to UE 102, gNB 126, SGW-C 130, SGW-U 132, PCF 138, DN 140, and P-CSCF 144, however, these elements are not shown in FIG. 6 for purposes of brevity only in order to illustrate other features that may be provided by SMF+PGW-C 136.

In the example illustrated in FIG. 6, consider that UE 102 has a session in the 4G RAT, as shown at 602, and that SMF+PGW-C 136 has received an ERIR and has initiated the ERIR delay timer at 604, similar to that as discussed above at 350 in FIG. 3. At 606, ePDG 440 may transmit a create session request including a handover indicator indicating a request to perform a handover of a UE, such as UE 102, to a Wi-Fi network. At 608, SMF+PGW-C 136 stops the ERIR delay timer and proceeds with the Wi-Fi handover based on receiving the create session request. If no request/ message (e.g., the create session request) is received before the timer expires, the ERIR is processed. For example, SMF+PGW-C 136 may process the ERIR and release the PDU connection. In this way, the session is not automatically released when SMF+PGW-C 136 receives the ERIR and the handover to Wi-Fi proceeds without UE 102 experiencing a dropped session.

Figure 7:
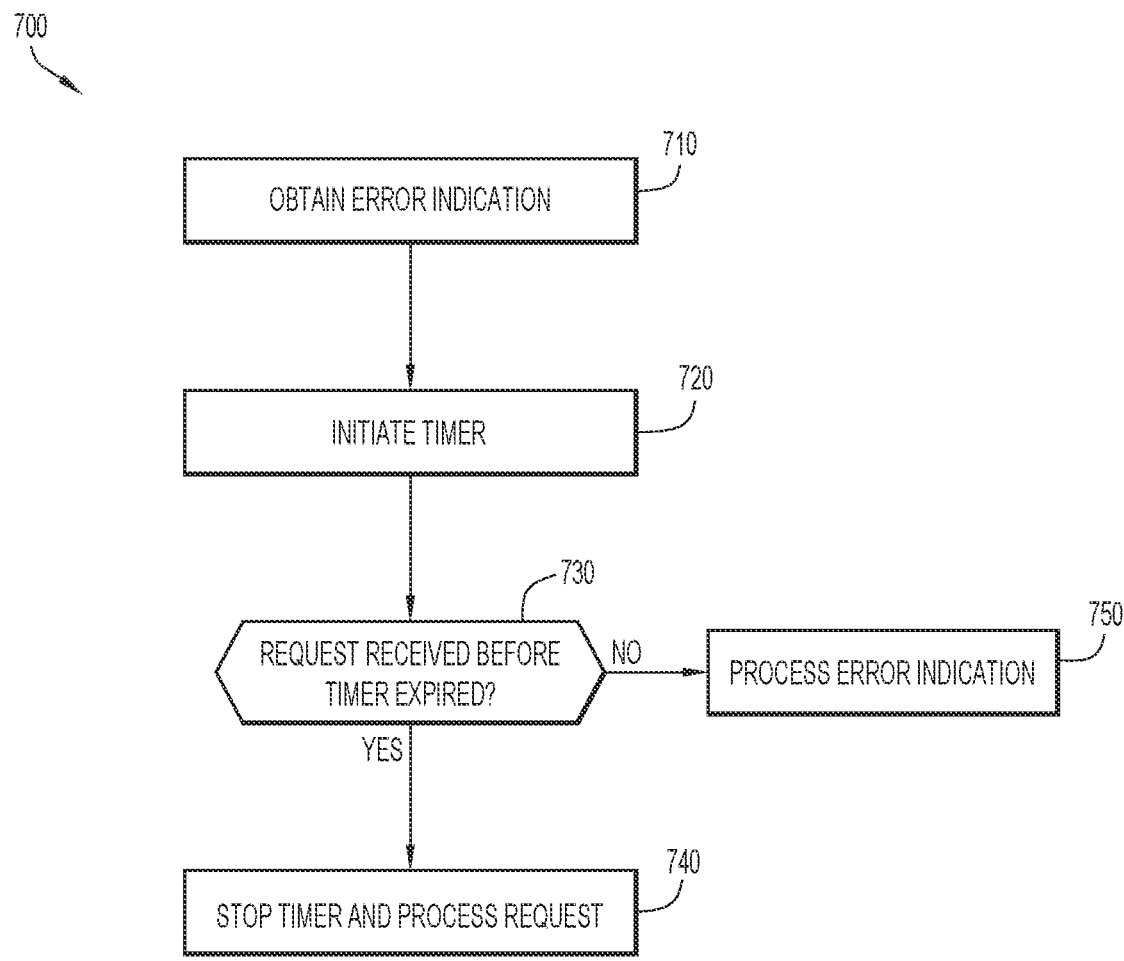
FIG. 7 is a flow chart depicting a method associated with delaying processing of an error indicator when performing an inter-access technology transition, according to an example embodiment.

Referring to FIG. 7, FIG. 7 is a flow chart depicting a method 700 according to an example embodiment. In particular, method 700 illustrates example operations that may be performed, at least in part, by SMF+PGW-C 136 to delay processing of an ERIR until an expiration of a timer, as discussed for various techniques presented herein.

At 710, the method may include obtaining an error indication. For example, SMF+PGW-C 136 may receive an ERIR from UPF+PGW-U 134 when downlink packets destined for a user device (such as UE 102) are received from a data network (such as DN 140) when the S1-U tunnel has been released and a handover procedure from 4G to 5G has been initiated for UE 102. At 720, SMF+PGW-C 136 initiates a timer. For example, SMF+PGW-C 136 may initiate an ERIR delay timer when the ERIR is received. A length of the timer may be configurable.

At 730, SMF+PGW-C 136 determines whether a request/ message has been received at SMF+PGW-C 136 before the timer has expired. For example, SMF+PGW-C 136 may determine whether a create SM context request message, a create/update/delete bearer response, a delete/update bearer command, a create session request for a handover to Wi-Fi, or a different message that triggers stopping the ERIR timer has been received prior to an expiration of the timer. If the request/message is received before the timer expires, at 740, the timer is stopped and the request/message is processed. If no request/message is received before the timer expires, at 750, the error indication is processed. For example, SMF+PGW-C 136 may process the ERIR and release the PDU connection.

Figure 8:
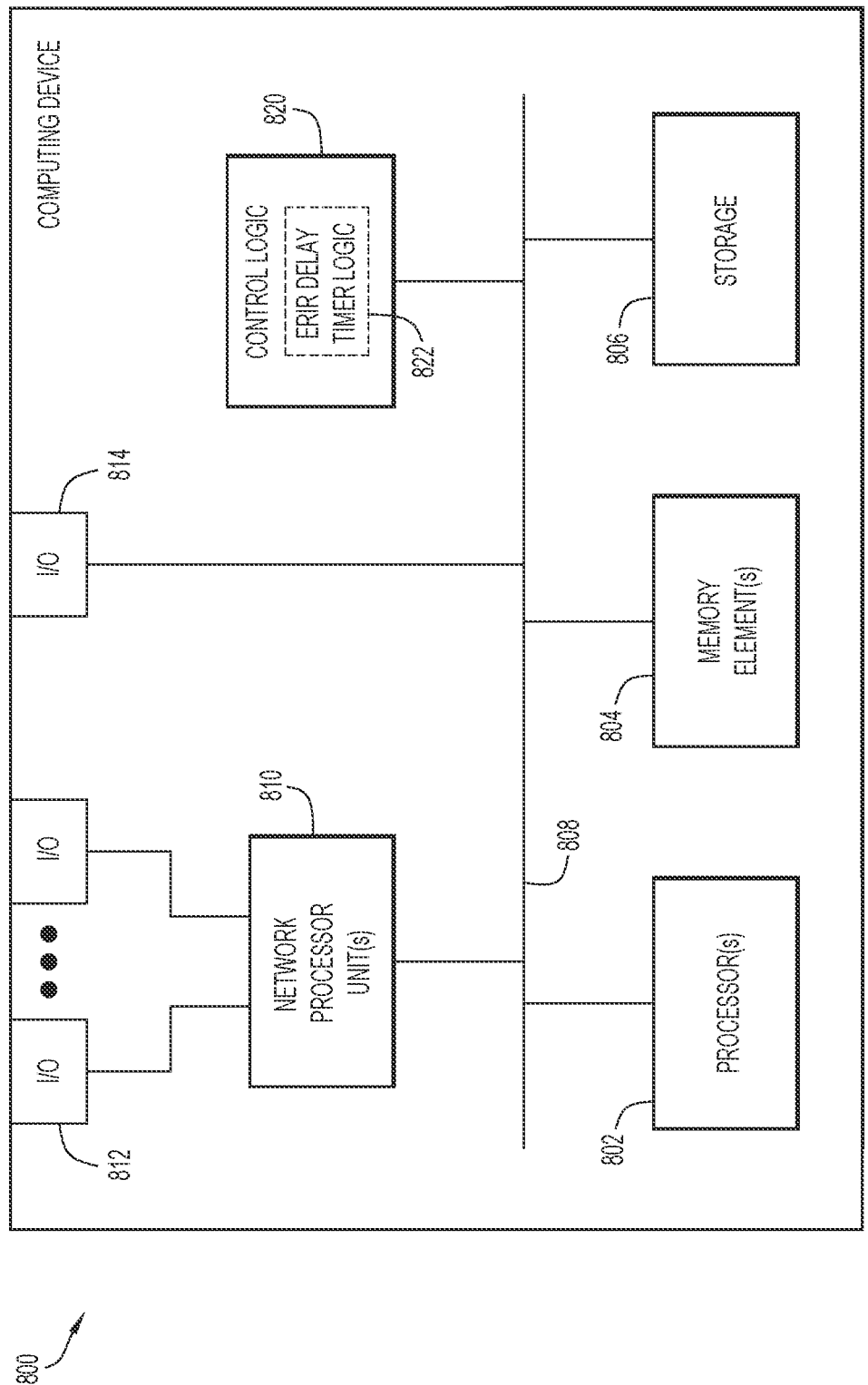
FIG. 8 is a hardware block diagram of a computing device that may perform functions associated with any combination of operations, in connection with the techniques discussed herein.

Referring to FIG. 8, FIG. 8 illustrates a hardware block diagram of a computing device 800 that may perform functions associated with delaying processing of an error indication as discussed herein in connection with the techniques described herein. In various embodiments, a computing device, such as computing device 800 or any combination of computing devices 800, may be configured as any of an MME, an AMF, an SGW-C, an SGW-U, an SMF+PGW-C, a PCF, a UPF+PGW-U, a P-CSCF, etc. as discussed for the techniques discussed herein.

It should be appreciated that FIG. 8 provides only an illustration of one embodiment and does not imply any limitations with regard to the environments in which different embodiments may be implemented. Many modifications to the depicted environment may be made.

In at least one embodiment, computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. For embodiments in which computing device 800 may be implemented as an SMF+PGW-C that is enhanced to provide ERIR delay processing, such as SMF+PGW-C 136 discussed with reference to FIGS. 3, 4, 5, 6, and 7, above, computing device may additionally include ERIR delay timer logic 822. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device. Processor(s) 802 (e.g., hardware processor(s)) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820 and/or ERIR delay timer logic 822) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 (and ERIR delay timer logic 822, if implemented) can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation in which computing device 800 is implemented as the SMF+PGW-C 136 of FIGS. 3, 4, 5, 6, and 7, control logic 820 and ERIR delay timer logic 822 can include instructions that, when executed, cause processor(s) 802 to perform operations including obtaining, from a UPF, an error indication associated with UE for which a handover has been initiated from a 4G network to a 5G network; initiating a timer in response to receiving the error indication; stopping the timer and processing a request when the request is obtained before an expiration of the timer; and processing the error indication when the request is not received before the expiration of the timer.

Figure 9:
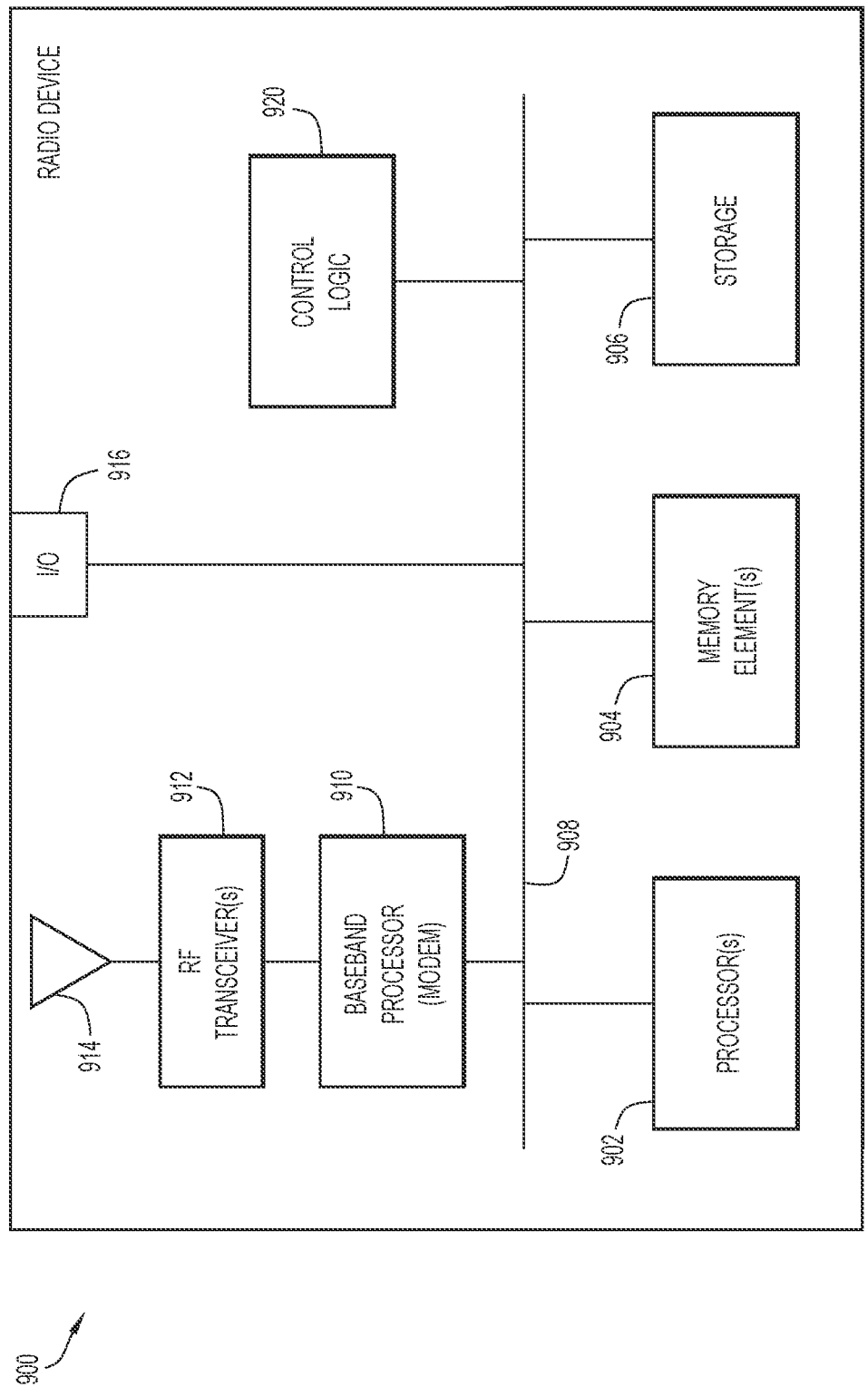
FIG. 9 is a hardware block diagram of a radio device that may perform functions associated with any combination of operations, in connection with the techniques discussed herein.

Referring to FIG. 9, FIG. 9 illustrates a hardware block diagram of a radio device 900 that may perform functions associated with operations discussed herein. In various embodiments, a user equipment or apparatus, such as radio device 900 or any combination of radio device 900, may be configured as any radio node/nodes as depicted herein in order to perform operations of the various techniques discussed herein, such as operations that may be performed by any of a user device, such as UE 102, eNB 116, and gNB 126.

In at least one embodiment, radio device 900 may be any apparatus that may include one or more processor(s) 902, one or more memory element(s) 904, storage 906, a bus 908, a baseband processor or modem 910, one or more radio RF transceiver(s) 912, one or more antennas or antenna arrays 914, one or more I/O interface(s) 916, and control logic 920.

The one or more processor(s) 902, one or more memory element(s) 904, storage 906, bus 908, and I/O interface(s) 916 may be configured/implemented in any manner described herein, such as described herein at least with reference to FIG. 8.

The RF transceiver(s) 912 may perform RF transmission and RF reception of wireless signals via antenna(s)/antenna array(s) 914, and the baseband processor (modem) 910 performs baseband modulation and demodulation, etc. associated with such signals to enable wireless communications for radio device 900.

In various embodiments, control logic 920, can include instructions that, when executed, cause processor(s) 902 to perform operations, which can include, but not be limited to, providing overall control operations of radio device 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820/920 and ERIR delay timer logic 822, if implemented) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804/904 and/or storage 806/906 can store data, software, code, instructions (e.g., processor instructions), logic, parameters, combinations thereof, and/or the like used for operations described herein. This includes memory element(s) 804/904 and/or storage 806/906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided that may include obtaining, by a session management function (SMF) from a user plane function (UPF), an error indication associated with a user equipment (UE) for which a handover has been initiated from a Fourth Generation (4G) network to a Fifth Generation (5G) network; initiating a timer in response to receiving the error indication; stopping the timer and processing a request when the request is obtained before an expiration of the timer; and processing the error indication when the request is not received before the expiration of the timer.

In one example, processing the request may include performing the handover from the 4G network to the 5G network. In another example, the request may include a Create Session Management (SM) Session Context request obtained from an access and mobility management function (AMF). In another example, the request may include one of an update or delete bearer command obtained from a control plane serving gateway (SGW-C). In another example, the request may include one of a create, update, or delete bearer response obtained from a control plane serving gateway (SGW-C). In another example, the request may include a create session request including a handover indicator for a wireless local area network handover. In another example, processing the error indication may include releasing a protocol data unit (PDU) connection associated with the UE.

In another form, an apparatus is provided that includes a memory for storing data; a network interface configured to enable network communications; and a processor for executing instructions associated with the data, wherein executing the instructions causes the apparatus to perform operations, comprising: obtaining, from a user plane function (UPF), an error indication associated with a user equipment (UE) for which a handover has been initiated from a Fourth Generation (4G) network to a Fifth Generation (5G) network; initiating a timer in response to receiving the error indication; stopping the timer and processing a request when the request is obtained before an expiration of the timer; and processing the error indication when the request is not received before the expiration of the timed.

In still another form, one or more non-transitory computer-readable storage media encoded with instructions are provided that, when executed by a processor, cause the processor to perform operations, comprising: obtaining, from a user plane function (UPF), an error indication associated with a user equipment (UE) for which a handover has been initiated from a Fourth Generation (4G) network to a Fifth Generation (5G) network; initiating a timer in response to receiving the error indication; stopping the timer and processing a request when the request is obtained before an expiration of the timer; and processing the error indication when the request is not received before the expiration of the timer.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a session management function (SMF), an error indication associated with packets destined to a user equipment (UE) for which a handover has been initiated from a Fourth Generation (4G) network to a Fifth Generation (5G) network, the error indication being obtained from a user plane function (UPF);
initiating a timer in response to receiving the error indication;
stopping the timer and processing a request when the request is obtained before an expiration of the timer; and
processing the error indication when the request is not received before the expiration of the timer.

2. The method of claim 1, wherein processing the request includes performing the handover from the 4G network to the 5G network.

3. The method of claim 1, wherein the request includes a Create Session Management (SM) Session Context request obtained from an access and mobility management function (AMF).

4. The method of claim 1, wherein the request includes one of an update or delete bearer command obtained from a control plane serving gateway (SGW-C).

5. The method of claim 1, wherein the request includes one of a create, update, or delete bearer response obtained from a control plane serving gateway (SGW-C).

6. The method of claim 1, wherein the request includes a create session request including a handover indicator for a wireless local area network handover.

7. The method of claim 1, wherein processing the error indication includes releasing a protocol data unit (PDU) connection associated with the UE.

8. An apparatus comprising:
a memory for storing data;
a network interface configured to enable network communications; and
a processor for executing instructions associated with the data, wherein executing the instructions causes the apparatus to perform operations, comprising:
obtaining an error indication associated with packets destined for a user equipment (UE) for which a handover has been initiated from a Fourth Generation (4G) network to a Fifth Generation (5G) network, the error indication being obtained from a user plane function (UPF);
initiating a timer in response to receiving the error indication;
stopping the timer and processing a request when the request is obtained before an expiration of the timer; and
processing the error indication when the request is not received before the expiration of the timer.

9. The apparatus of claim 8, wherein processing the request further comprises:
performing the handover from the 4G network to the 5G network.

10. The apparatus of claim 8, wherein the request includes a Create Session Management (SM) Session Context request obtained from an access and mobility management function (AMF).

11. The apparatus of claim 8, wherein the request includes one of an update or delete bearer command obtained from a control plane serving gateway (SGW-C).

12. The apparatus of claim 8, wherein the request includes one of a create, update, or delete bearer response obtained from a control plane serving gateway (SGW-C).

13. The apparatus of claim 8, wherein the request includes a create session request including a handover indicator for a wireless local area network handover.

14. The apparatus of claim 8, wherein processing the error indication further comprises:
releasing a protocol data unit (PDU) connection associated with the UE.

15. One or more non-transitory computer-readable storage media encoded with instructions that, when executed by a processor, cause the processor to perform operations, comprising:
obtaining an error indication associated with packets destined for a user equipment (UE) for which a handover has been initiated from a Fourth Generation (4G) network to a Fifth Generation (5G) network, the error indication being obtained from a user plane function (UPF);
initiating a timer in response to receiving the error indication;
stopping the timer and processing a request when the request is obtained before an expiration of the timer; and
processing the error indication when the request is not received before the expiration of the timer.

16. The one or more non-transitory computer-readable storage media of claim 15, wherein processing the request further comprises:
   performing the handover from the 4G network to the 5G network.

17. The one or more non-transitory computer-readable storage media of claim 15, wherein the request includes a Create Session Management (SM) Session Context request obtained from an access and mobility management function (AMF).

18. The one or more non-transitory computer-readable storage media of claim 15, wherein the request includes one of an update or delete bearer command obtained from a control plane serving gateway (SGW-C).

19. The one or more non-transitory computer-readable storage media of claim 15, wherein the request includes one of a create, update, or delete bearer response obtained from a control plane serving gateway (SGW-C).

20. The one or more non-transitory computer-readable storage media of claim 15, wherein the request includes a create session request including a handover indicator for a wireless local area network handover.

\* \* \* \* \*